United States Patent [19]

Ragsdale et al.

[11] Patent Number: 5,184,377
[45] Date of Patent: Feb. 9, 1993

[54] SWIMMING POOL ANCHOR AND REMOVAL TOOL

[75] Inventors: Kelly J. Ragsdale, Salt Lake City; Cory Brady, West Jordan, both of Utah

[73] Assignee: Cover-Pools, Inc., Salt Lake City, Utah

[21] Appl. No.: 798,692

[22] Filed: Nov. 26, 1991

Related U.S. Application Data

[63] Continuation of Ser. No. 577,944, Sep. 4, 1990, Pat. No. 5,067,213, which is a continuation-in-part of Ser. No. 377,235, Jul. 7, 1989, Pat. No. 4,953,269.

[51] Int. Cl.⁵ .................. F16B 21/00; B25B 13/06
[52] U.S. Cl. ................ 24/704.1; 24/115 G; 81/176.15
[58] Field of Search ............... 24/704.1–704.6, 24/115 G, 135 L, 136 L, 297, 590; 411/508, 553; 81/176.1, 176.15, 460, 461

[56] References Cited

U.S. PATENT DOCUMENTS

| | | | |
|---|---|---|---|
| 1,414,838 | 5/1922 | Street | 24/625 |
| 2,209,638 | 7/1940 | Smith | 24/115 G |
| 2,446,253 | 8/1948 | Tresidder | 24/115 G |
| 2,698,557 | 1/1955 | Harper | 411/508 |
| 2,781,683 | 2/1957 | Weeks | 81/176.15 |
| 3,908,235 | 9/1975 | Telliard et al. | 411/508 |
| 4,453,295 | 6/1984 | Laszczower | 24/115 G |
| 4,569,259 | 2/1986 | Rubin et al. | 81/176.15 |

FOREIGN PATENT DOCUMENTS 1021215  3/1966  United Kingdom ............. 24/704.1

Primary Examiner—Victor N. Sakran
Attorney, Agent, or Firm—Trask, Britt & Rossa

[57] ABSTRACT

A fastener and removal tool adapted for manually securing and thereafter detaching two separate members in a preselected spatial relationship is disclosed. The fastener includes an elongate shaft, an inlet means mounted on a first shaft end, and a catch means mounted on an opposing shaft end. The removal tool includes a handle and a rod having a laterally-extending finger. The tool is adapted to be inserted into the fastener for purposes of subsequently applying a longitudinally-directed force against the fastener, thereby effecting a collapse of the fastener sufficient to permit the retraction of the fastener from its engagement with the connected members.

4 Claims, 4 Drawing Sheets

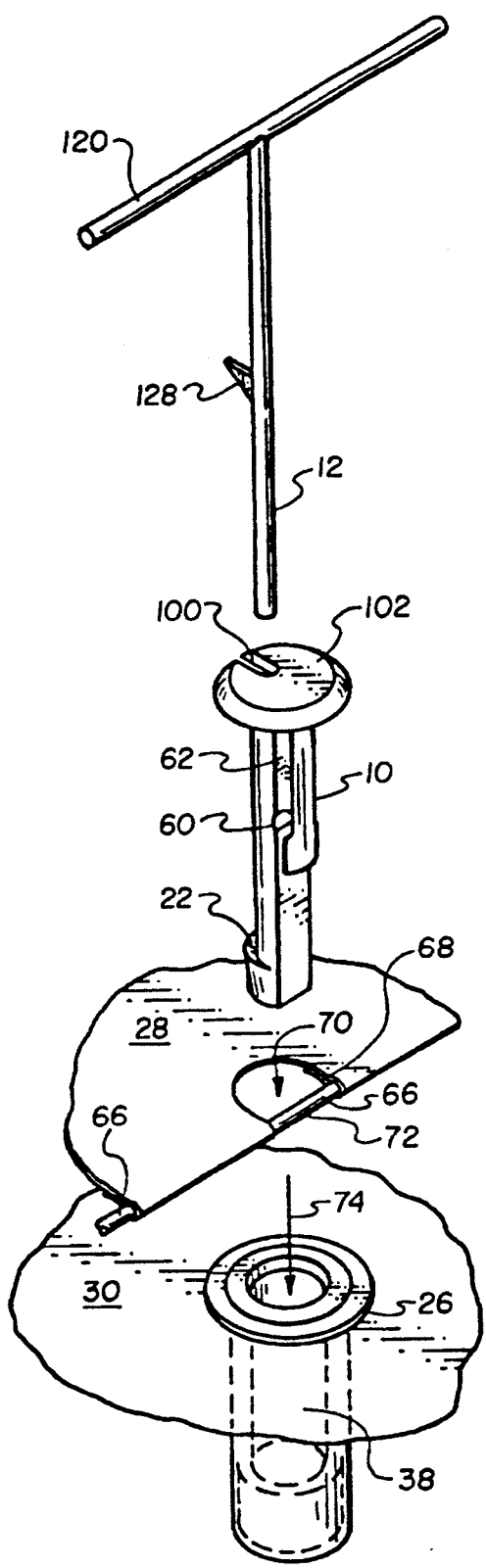
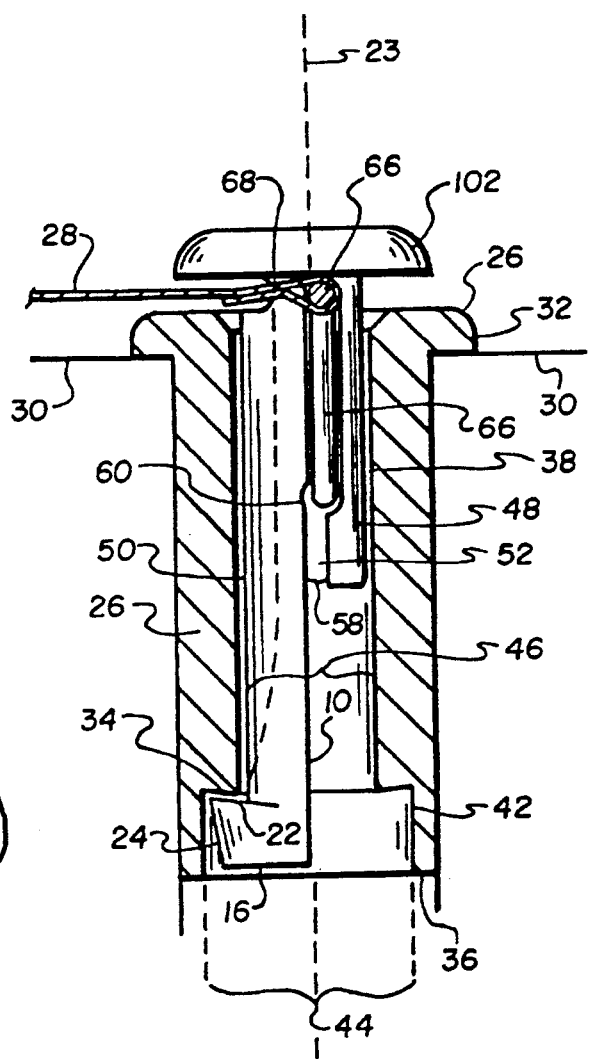
Fig. 2
Fig. 3

SWIMMING POOL ANCHOR AND REMOVAL TOOL

This is a continuation of application Ser. No. 07/577,944, now U.S. Pat. No. 5,067,213 filed Sep. 4, 1990 which is a continuation-in-part of application Ser. No. 07/377,235 filed Jul. 7, 1989, now U.S. Pat. No. 4,453,269.

BACKGROUND OF THE INVENTION

1. Field

This invention relates to fasteners adapted for securing two members together in a preselected spatial orientation.

2. Statement of the Art

Various fastener constructions have been suggested in the art for use in connecting one article to another. One particular environment wherein fasteners have been extensively used is in the area of swimming pool covers. For many years, swimming pool owners, anxious to protect the water in their swimming pools from contamination from blowing dirt and leaves, and furthermore, to render such pools safer, have utilized fabric covers positioned over the pools. To secure the cover in place, various means have been adapted. One method involves the drilling of a plurality of upright holes in the pool deck about the perimeter of a pool. The cover, fitted with a plurality of grommets is positioned about the pool perimeter whereby each grommet registers with a respective deck-defined hole. An elongate fastener is individually inserted through a respective grommet and into a corresponding hole to form a securement of the cover with the deck. This fastener is typically one fabricated of a resilient plastic material and is constructed to initially collapse upon being inserted through the grommet and deck hole. Upon being inserted a preselected distance, the fastener expands to abut the sidewalls of the hole to produce a connection engagement.

Owing to the necessity of repeatedly removing the cover to use the pool, the fasteners must be frequently retracted from their retaining holes to free the cover and thereby permit its removal. In the past, a tool having a general configuration of a conventional dandelion puller has been used to remove the fasteners. Such pullers typically include a pair of jaws which are inserted beneath a laterally-extending flange or lip of the fastener The puller is then used like a lever to pry the fastener from its engagement with the deck hole. The use of such pullers often result in the destruction of individual fasteners due to the particular forces being applied thereto by the puller tool.

There continues to be a need for a fastener and tool arrangement which provides a means of securing a pool cover to a deck which is easily removed while minimizing the chances such a removal will damage the fastener The above-described method for positioning and securing a pool cover has its drawbacks. Often times, the cover has a baggy appearance and lacks a means to tighten or cinch the cover to remove this baggy appearance. This particular invention not only provides a fastener and tool arrangement which provides a means of securing a pool cover to a deck which is easily removed, but also has the additional feature of a cinching means to remove the baggy appearance and to better protect the pool from outside elements.

SUMMARY OF THE INVENTION

The invention discloses a removal tool and a fastener means adapted for detachably securing together, in a predetermined spatial relationship, a first member, defining an aperture therein, and a second member defining a fastener-receiving aperture.

The fastener means is configured to be inserted through the first member aperture and thereafter be secured within the second member aperture. The fastener means is constructed of a resilient material and adapted to be collapsible, permitting the fastener to be inserted through the aforesaid apertures in a collapsed condition and, upon reaching a preselected position within the second member, expand to abut the sidewalls of the second member aperture in a connection-producing engagement.

A fastener means of the invention may include an elongate shaft having opposing ends. Mounted on a first end of the shaft is a head. The head, which defines a slot or aperture therein, extends outwardly, i.e. laterally from the surface of the shaft member. The head forms a flange or lip-like structure with respect to the shaft. The head forms an abutment surface whereby the fastener means, upon its insertion through the first member, and into the second member may function to secure or retain that first member in am abutting relationship against the second member due to the engagement of the flange-like head against the first member.

The shaft of the fastening means may be configured to define two longitudinally-extending leg members. The first leg member, which is dimensioned to be longitudinally longer than the second leg member, is fitted on its end with a lip or flange-like, structure which is adapted to engage a sidewall of the aperture in the second member. This lip is adapted to form a connection means for releaseably connecting the fastening means with the second member. The shaft is fabricated of a resilient material This particular choice of material permits the shaft to be collapsed about itself during its insertion through the apertures in the first and second members.

The second leg member, which is dimensionally shorter than the first leg member, is spaced laterally from the first leg member thereby defining a space or channel therebetween. This channel which may be viewed as extending generally through the entire width of the shaft, and furthermore, extending a measured distance along the longitudinal length of the shaft, is dimensioned to slideably receive a cord or cable. Specifically, this channel is dimensioned to receive a cord which may be sewn into the first member about its perimeter. One use of the invention is the connection of a fabric panel or cover (the first member) to a deck (second member). This cover may define a plurality of apertures spacedly positioned about its perimeter which expose a section of the cord. The apertures permit the user to engage the cord within the channel of the fastener means by simply inserting the shaft through one of the apertures while catching and directing the cord into the aforesaid laterally-extending channel Upon the insertion of the fastener means into the aperture within the second member, the cord can be forcefully inserted together with the fastening means into the aperture of the second member. The insertion of the cord into the second member effects a tourniquet-like constriction of the cover as the length of the cord positioned above the fastener is dimensionally reduced as segments of the cord are displaced downward through the apertures in the second member while the remainder of the cover is retained above that aperture.

The shaft of the fastening means may include two longitudinally-extending, open channels which are configured within the exterior sidewall of the shaft of the fastener means. These channels, which may be positioned substantially diametrically opposite one another about the shaft, are configured to receive the cord of the cover along a selected length of the shaft. The longitudinal channels are sufficiently dimensioned such that upon the insertion of the cord into those channels, the outer diameter of the combined shaft and cords is still insertable into the apertures of the first and second members.

The invention also includes a removal tool which is adapted for engaging a fastener means, which has been engaged with a second member, and removing that fastener means from its engagement with the second member. The removal tool includes a handle and a longitudinallyextending shaft, having mounted thereon a laterallyextending finger or extension. The longitudinal shaft is dimensioned to be received in the slot defined within the fastener means head. The longitudinal shaft is also adapted to be inserted through the slot sufficiently that the finger or extension passes through the slot and is subsequently positioned at a location beneath the bottom surface of the head. After the user has inserted the shaft into the slot sufficiently that the finger is positioned below the head and he rotates the shaft by means of the handle so that the finger is positioned beneath a laterally-extending portion of the surface of the head. Upon an upward-directed displacement of the handle or removal tool, the finger engages or abuts against that bottom surface and applies a upwardly-directed force to the fastener means.

The shaft of the removal tool is dimensioned sufficiently long that upon its insertion through the slot in the head, it may be directed downwardly or longitudinally along a length of the fastener shaft. In preferred constructions, the shaft including the first leg of the fastener means defines an open third channel which extends a substantial longitudinal length of the shaft and first leg. This third channel has a depth which decreases over the length of the shaft and first leg, i.e. the depth of the channel proximate the lower end of the first leg is dimensionally less than the depth of the channel at a location proximate the mounting of the shaft on the head. As the shaft of the removal tool is inserted through the slot in the head, it is directed into the third channel. As it proceeds along the length of that third channel and bottoms out against the decreasing depth region of the third channel,, the shaft tends to apply a laterally-directed force against the first leg, urging it toward the second leg. Upon the application of sufficient force against the first leg, the lip on the end of the first leg is disengaged from the sidewall of the receiving aperture of the second member As this disengagement occurs, the user may thereafter apply an upwardly-directed force against the head by means of the laterally-extending finger on the shaft and thereby remove the fastener means from the aperture in the second member.

BRIEF DESCRIPTION OF THE DRAWINGS

FIG. 2 is an exploded view of an in situ installation of the invention depicting a removal tool, a fastener, and an aperture defining swimming pool cover in association with a recess well defining sleeve;

FIG. 3 is a side elevational view of a fastener within a recess well defining sleeve;

DETAILED DESCRIPTION OF THE DRAWINGS

The invention disclosed is a fastener in association with a tool adapted to remove that fastener from a connection-producing engagement with a first and second member.

Figure 1:
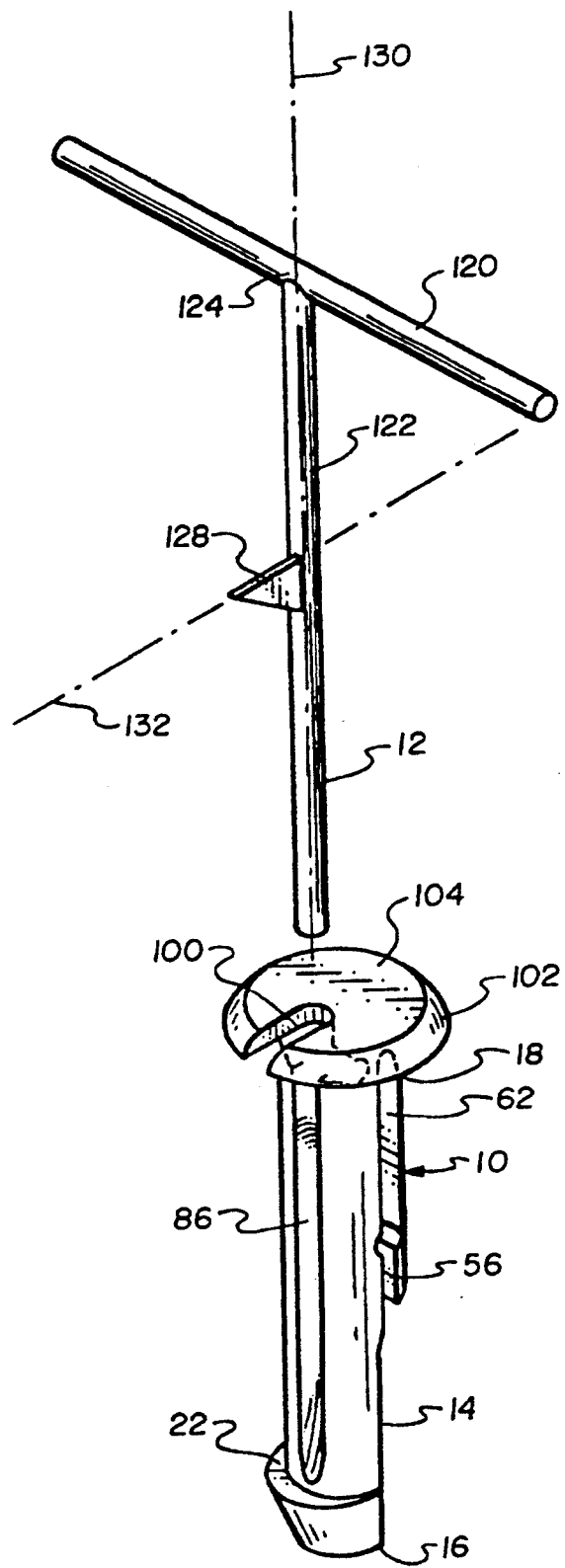
FIG. 1 is a perspective view of a fastener and removal tool of the invention.
Figure 4:
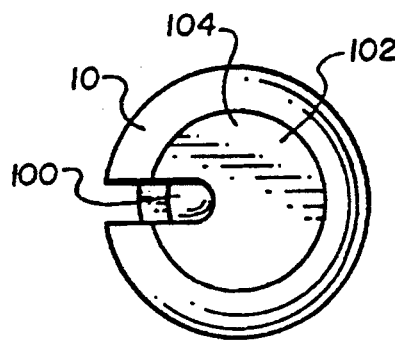
FIG. 4 is a top plan view of the head of the fastener of the invention.

As shown to advantage in FIGS. 1, 2 and 3, the invention includes a fastening means generally 10 and a removal tool generally 12. The fastener means 10 includes a longitudinally elongate shaft 14 having a first end 16 and an opposing end 18. The shaft 14 extends generally linearly along a longitudinal axis 20 as shown in FIG. 3. The shaft 14 defines a flange 22 on its first end 16. As shown to advantage in FIG. 1, this flange 22 is configured to extend outwardly from the exterior surface of the shaft 14 to form a generally perpendicularly-oriented shelf or lip. Furthermore, as shown in FIGS. 1 and 3, this lip is conjoined to a generally tapered sidewall 24 which extends from the shelf 22 to the end 16 of the shaft. This tapered wall 24 is adapted to facilitate the insertion of the shaft 14 into the apertures of the first and second member in that as the tapered sidewall engages against the sidewalls of the shaft 14, owing to its resilient material construction is bent or collapsed to facilitate its entry into the apertures. The lip 22 is specifically adapted to form an engagement, i.e., a releasable connection with a sleeve 26 which is shown to advantage in FIGS. 2 and 3. Throughout this description, an embodiment of the fastener means which is adapted for connecting a swimming pool cover 28 to a swimming pool deck 30, will be used for purposes of illustrating the various features and a proposed function of the invention. The tubular sleeve 26 is adapted to be positioned within a vertically-upright cylindrical channel defined within the deck 30. The sleeve 26 may be of any conventional sleeve construction and, as shown, may include a laterally-extending flange 32 on its upper end. The sleeve 26 furthermore, defines a laterally-extending flange or shelf 34 proximate its lower end 36. As shown to advantage in FIG. 3, the lip 22 of the shaft 14 is adapted to be inserted through a hollow, generally circular, conduit 38 defined in the interior of sleeve 26 sufficiently that the lip 22 may pass beyond the shelf ledge 34. Subsequent to the lip 22's longitudinal displacement beyond that shelf 34 and due to the resilient nature of the material from which the shaft 14 is fabricated, the flange 22 is displaced outwardly in the direction indicated by arrow 40 such that the lip 22 is positioned beneath the ledge 34 thereby providing a connection of the ledge 34 and the lip 22 sufficient to preclude the upward displacement of the shaft 14. As shown more specifically in FIG. 2 and also in FIG. 3, the ledge 34 may be formed by the drilling of a channel 42 in the end 36 of sleeve 26. Channel 46 defines a diameter 44 which is larger than the diameter 46 of the upright channel 38. It should be recognized that each of these channels are cylindrical in configuration and are configured about a common longitudinal axis 23.

The shaft 14 may be considered as defining a pair of longitudinally-extending leg members 48 and 50. As shown to advantage in FIGS. 1, 2 and 3, the leg member 48 is dimensionally shorter than the leg member 50. Each of the leg members defines a generally semi-circular cross-section. The leg members 48 and 50 are positioned spacedly apart from one another to define a channel or space 52 therebetween. The interior-facing surface of each of the leg members, i.e. 54 of leg 50 and surface 56 of leg 48, is generally planar in configuration. The planes of surfaces 54 and 56 are oriented generally parallel one another. It follows that channel 52 is defined by two vertically-extending planar surfaces. The channel 52 achieves a generally constant width 58 over the height thereof. The channel 52 extends through the complete width of the shaft 14 and therefore communicates with the environment on either side of the shaft. A laterally-extending, generally cylindrical channel 60 is defined in the shaft 14 and communicates with the channel 52. The channel 60 extends through the complete width of the shaft 14 and is positioned to extend generally orthogonally to the longitudinal axis 20 of the shaft 14.

Defined within the exterior surface of the shaft 14, between the location of the channel 60 and the top 18 of the shaft 14, are a pair of longitudinally-extending, open channels 62 and 64. These channels are shown more specifically in FIGS. 7 and 8. Each of these channels defines a generally semi-circular cross-section and extend partially through the width of the shaft 14. Each of the channels 62 and 64 communicate with the conduit 60.

Figure 8:
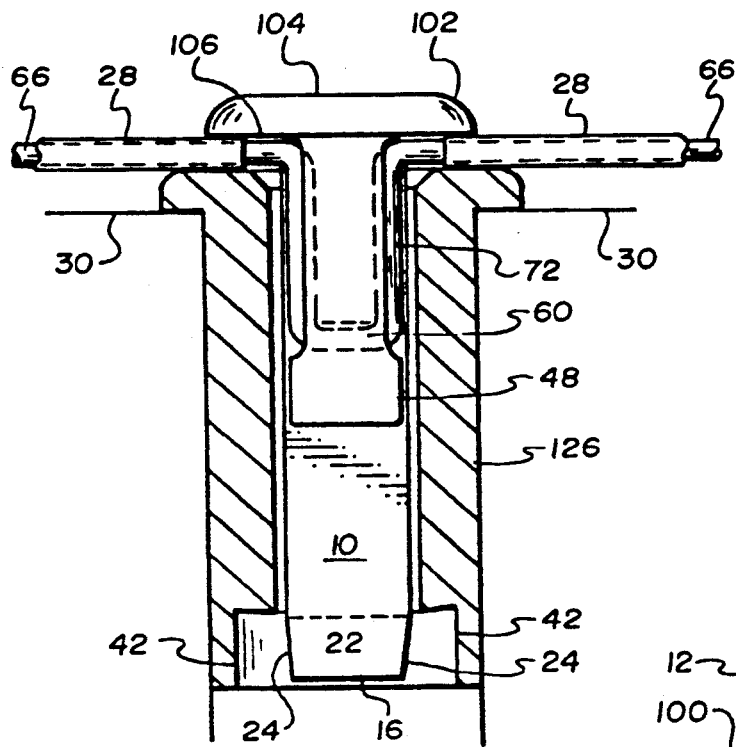
FIG. 8 is a side elevational view of a fastener of the invention positioned within a sleeve-retaining deck holes.

The width 58 of conduit 52 and the diameter of channel 60 are each dimensioned to slideably receive a cord or cable 66. As shown in FIG. 2, the cover 28 is constructed to define a cable or cord 66 positioned about its perimeter. In preferred constructions, this cable 66 is a single member positioned to extend continuously about substantially the entire perimeter of the cover 28. The cable 66 is enclosed within the structure of the cover 28 by a hem, generally 68, formed in the cover with the cable being enclosed within that hem. The cover 28 defines about its perimeter a plurality of apertures 70. Each aperture extends through the entire width of the cover 28. The apertures 70 are positioned at spaced intervals about the cover perimeter. Each aperture 70 is formed contiguous to the edge of the cover 28 so as to expose a section 72 of the cable 66 as shown to advantage in FIG. 2. It should be understood that the construction of this aperture together with its exposure of a cord segment 72 occurs at spaced intervals about the entire perimeter of the cover 28. The conduit 52 and the channel 60 are each dimensioned to slideably receive the cord section 72 upon the insertion of the fastener means 10 through the aperture 70 as indicated in FIG. 2. Upon the fastener means 10 being displaced in the direction indicated by a arrow 74 through aperture 70, the cable segment 72 is first directed along the surface 54 of leg 50 until such time as it is directed into conduit 52 eventually being directed, upon further vertical downward displacement of the fastener means 10, into channel 60. This results in the cable segment 72 being positioned in the orientation shown in FIG. 3. As the fastener means 10 is further directed downward through the channel 38 of the sleeve 26, a cable segment 72 is likewise directed into the respective channels 62 and 64. This positions the cable segment 72 in the orientation shown to advantage in FIGS. 3 and 8. It should be recognized that the cable 66 substantially corresponds in length to the length of the perimeter of the cover 28. It follows that as the cover 28 is placed on the deck 30 and each fastener means 10 is inserted into respective aperture 70 and is thereafter installed in a respective sleeve 26 in the deck 30, that the length of the cable 66 is in some degree being directed downward into each of the generally "U"-shaped configured orientations as shown in FIG. 8. This orientation of the cable serves to decrease in dimension the length of the cable which is retained above the surface of the deck 30. Understandably, the displacement of the "U"-shaped segments of the cable 66 causes the rope to constrict of otherwise tighten the cover 28 about the deck surface 30. The fastener means 10 function as a means not only of securing the cover 28 to the deck surface 30, but furthermore, the fasteners 10 serve to tighten or otherwise constrict the cover 28 on the surface of the deck 30. This tightening in the cover contributes to the user being able to tighten the cover about a structure such as a swimming pool over which it has been placed recognizing that the swimming pool is defined within a deck surface 30. It follows that the user may therefore tighten the cover sufficiently so as to preclude the entry of debris in the space between the cover and the surface of the deck 30. As shown to advantage in FIG. 8, the conduit 62 and 64 are dimensioned to have a depth 75 which is sufficient to receive a significant portion of the diameter of the cable 66 such that the fastener means 10 having the cable segment 72 positioned therein does not present a diameter of sufficient dimension to preclude the entry of the combination of the fastener means 10 with the cable segment 72 into the conduit 30 of sleeve 26. As shown in FIG. 8 it is preferred that the conduit 62 and 64 be dimensioned sufficiently so as to permit a slideable insertion of the combination of the fastener means with the cable segment 72 in the directions indicated by arrow 80 without any undue binding or drag on the surface of the cable segment 72 against the inner sidewall 82 of the sleeve 26.

Figure 5:
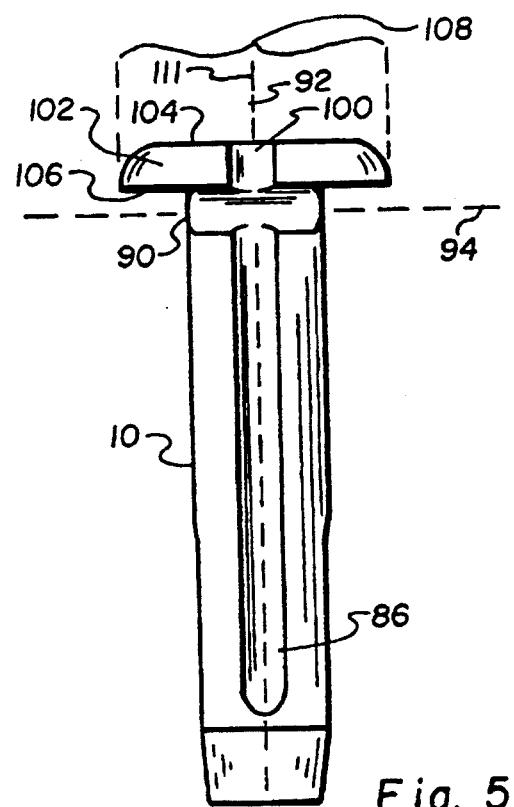
FIG. 5 is a side elevational view of the fastener of the invention.
Figure 6:
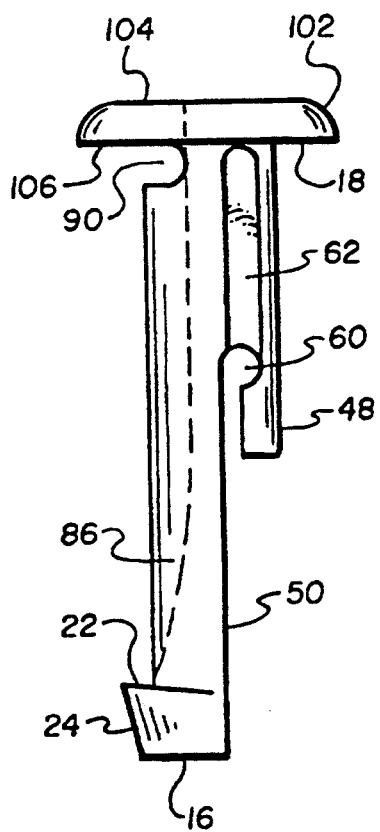
FIG. 6 is a side elevational view of the fastener of FIG. 5 rotated by ninety (90°) degrees.
Figure 7:
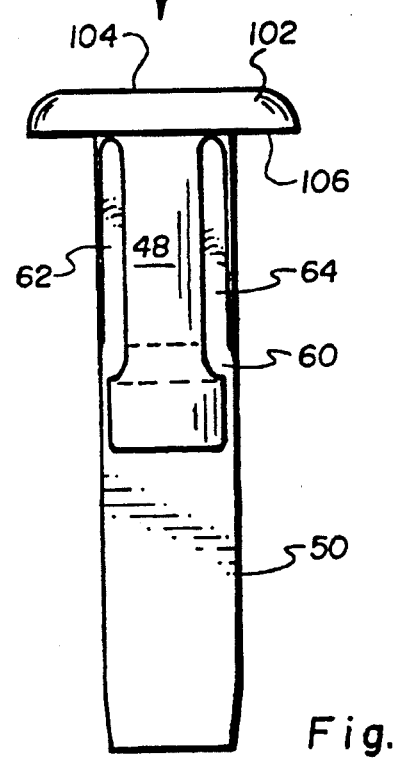
FIG. 7 is a side elevational view of the fastener of FIG. 5 rotated by one-hundred-eighty (180°) degrees.

As shown to advantage in FIG. 5, the shaft 14 may likewise define a further longitudinally-extending channel 86 in the surface of the shaft 14. As shown in FIG. 6, this channel 86 has a depth 88 which varies dimensionally over the length of the channel. As specifically seen in dotted segment lines in FIG. 6, the depth 88 of channel 86 achieves a maximum dimensional depth proximate the head 18 and extends longitudinally along the length of the shaft and eventually begins to decrease dimensionally in depth as one depth follows a generally curvilinear configuration. Defined contiguous with the channel 86 as a laterally-extending channel 90 which is defined proximate the upper end 18 of shaft 14. As seen to advantage in FIG. 5, the longitudinal axis 92 of channel 86 is orthogonal to the longitudinal axis 94 of channel 90. Channel 90 extends generally across the entire diameter or width of shaft 14 and communicates with the exterior sidewalls of the shaft 14. The channel 90 furthermore communicates with an elongate slot 100 which is defined within the head 102 of fastener means 10. As shown to advantage in FIGS. 1 through 9, the head 102 is a generally disc-shaped structure having a substantially circular circumference and defining a pair of planar-opposed top and bottom surfaces generally 104 and 106. The diameter 108 of head 102 is dimensionally larger than the diameter 110 of shaft 14. It follows as shown in FIGS. 5 through 7 that the head 102 extends laterally from the exterior sidewalls of shaft 14 so as to form a flange or shelf-like structure about the end 18 of shaft 14. This flange is operative to form an abutment surface against the cover 28 upon the fastening means 10 being positioned in engagement with the sleeve 26 in deck 30 as shown to advantage in FIG. 8 and therefore is useful in retaining the cover 28 in place due to the abutment of that cover against the surface bottom 106 of the head as shown to advantage in FIG. 8. Furthermore, the head 102, more specifically, the flange formed thereby is dimensioned so as to preclude entry into the channel 38 of sleeve 26.

The longitudinal axis 111 of slot 100 is collinear with the longitudinal axis 92 of channel 86. The slot 100, channel 90 and channel 86 are specifically configured for use in conjunction with a removal tool 12 as a means of permitting the user to disengage the fastener means 10 subsequent to its insertion and engagement with the sleeve 26.

REMOVAL TOOL

Figure 9:
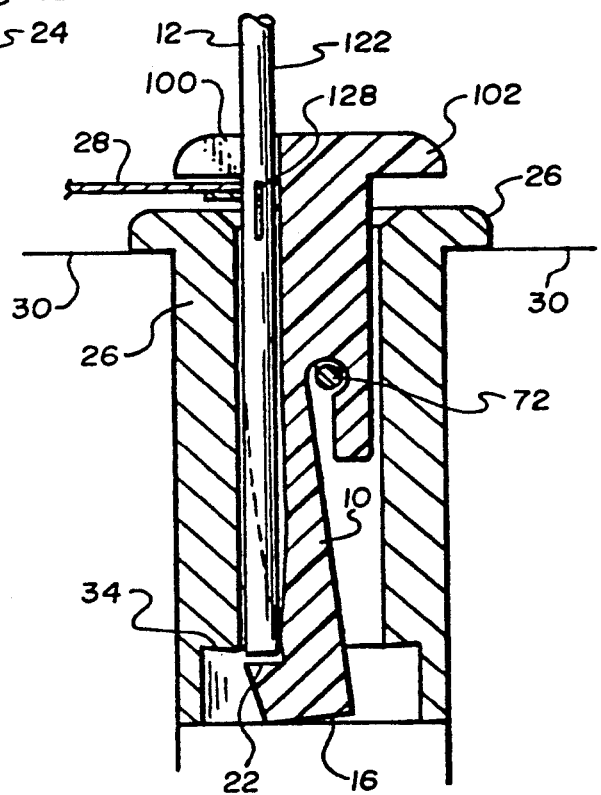
FIG. 9 is a side elevational view of a removal tool engaging a fastener within a recess well defining sleeve.

As shown to advantage in FIGS. 1 and 2, the removal tool 12 includes a handle 120 and a longitudinally-extending shaft 122 which is mounted on that handle. Mounted between the ends 124 and 126 of shaft 122 is a laterally-extending extension for finger 128. As shown in FIGS. 1 and 2, each of the handle 120, the shaft 122 and the finger 128 may each be formed of a generally cylindrical rod or shaft member. The diameter of shaft 122 is specifically dimensioned to permit the insertion of that shaft through the slot 100 defined in head 102. Furthermore, the slot 100 is also dimensioned to receive the finger 128. As shown in FIGS. 1 and 2, the finger 128 is configured to extend substantially orthogonally or laterally outward from the shaft 122, more specifically, the longitudinal axis 130 of shaft 122 is oriented orthogonally to the longitudinal axis 132 of finger 128. Upon the insertion of shaft 122 into the slot 100, the shaft 122 is directed through the conduit 90 and downward into the channel 86 in the direction indicated by arrow 134 in FIG. 5. After a given displacement of the shaft 122 downward through the channel 86, the finger 128 passes through the slot 100 whereby the finger 128 is thereafter positioned beneath the surface 106 of head 102. Upon the positioning of the finger 128 beneath the surface 106, the user thereafter rotates the removal tool 12 about the longitudinal axis 130 of shaft 122 so as to position the finger 128 within the channel 90 as indicated in FIG. 9. With the finger 128 in the orientation shown in FIG. 9, it is not only positioned within the channel 90, but it is also positioned beneath the surface 106 of head 102. It follows that upon an upward displacement of the handle 120 in the direction indicated by arrow 140 in FIG. 9, the user may apply a upwardly-directed force against the surface 106 of head 102.

As the shaft 122 is inserted downward along the channel 86 upon the shaft displacement a given distance, it begins to encounter the decreasing depth 88 of that channel. Since the leg 50, more specifically, the shaft 14, is fabricated from a resilient material, the leg 50 is displaceable in the direction indicated by arrow 142 in FIG. 9. As shown in FIG. 9, more specifically, the shaft 122 not only engages against the bottom of the channel 86, but furthermore, the shaft 122 also engages against the vertical upright sidewall of the sleeve 26. Since the sleeve 26 is fabricated typically from a non-resilient material such as metal, the shaft 122 also being fabricated from a rigid material such as metal, neither of these two members are adapted to bend. It follows that as the shaft 122 is inserted further down into the channel 86, that a force directed in the direction indicated by arrow 142 is applied to the leg 50 by the shaft 122 as the shaft 122 is further inserted. Eventually the lip 22 of the fastener means is disengaged from its abutment against the shelf 34 of the sleeve 26 sufficiently that the tip of the lip is withdrawn sufficiently toward the interior of the conduit 38 such that upon an upwardly-directed force 140 against the underside 106 of head 102 by finger 128, the fastener 10 may be vertically retracted from the housing 126.

Reference in this disclosure to details of the specific embodiment is not intended to restrict the scope of the appended claims, which themselves recite those features regarded as essential to the invention.

What is claimed is:

1. A fastener for use in securing a first member defining an aperture therethrough and a second member defining a receiving aperture therethrough, said fastener comprising:

a first shaft having two longitudinally-extending legs, said legs being positioned spatially apart from one another to define a laterally-extending first channel therebetween; a first said leg having a lip on a free end thereof; said first shaft defining a pair of longitudinally-extending open second channels configured in an exterior sidewall of said first shaft, said second channels communicating with said first channel to form an upright "U"-shaped channel in an exterior surface of said first shaft, said first channel and said second channels being dimensioned to receive a cord mounted on said first member proximate said aperture in said first member and form said cord in an upright "U"-shaped configuration about said exterior surface of said first shaft;

a head mounted on said first shaft, said head defining a slot herein, wherein said first shaft defines a longitudinal open third channel in said exterior sidewall; said first shaft further defining an open, laterally-extending fourth channel in said exterior sidewall, said fourth channel being at an interface of said head and said first shaft; said fourth channel communicating with said slot and said third channel;

wherein said fastener is adapted to engage said first member cord in said first and second channels and be inserted through said aperture of said first member and said receiving aperture of said second member, said lip being engageable with said second member to retain said fastener and cord within said second member receiving aperture.

2. In combination, a fastener for use in releasably securing a first member defining an aperture therethrough and a second member defining a receiving aperture therethrough and a removal tool for removing said fastener from said first member aperture and said second member receiving aperture; said fastener comprising:

a first shaft having two longitudinally-extending legs, said legs being positioned spatially apart from one another to define a laterally-extending firs channel therebetween; a first said leg having a lip on a free end thereof; said first shaft defining a pair of longitudinally-extending open second channels configured in an exterior sidewall of said first shaft, said second channels communicating with said first channel to form an upright "U"-shaped channel in an exterior surface of said first shaft, said first channel and said second channels being dimensioned to receive a cord mounted on said first member proximate said aperture in said first member and form said cord in an upright "U"-shaped configuration about said exterior surface of said first shaft;

a head mounted on said first shaft, said head defining a slot therein, wherein said first shaft defines a longitudinal open third channel in said exterior sidewall; said first shaft further defining an open, laterally-extending fourth channel in said exterior sidewall, said fourth channel being at an interface of said head and said first shaft; said fourth channel communicating with said slot and said third channel;

wherein said fastener is adapted to engage said first member cord in said first and second channels and be inserted through said aperture of said first member and said receiving aperture of said second member, said lip being engageable with said second member to retain said fastener and cord within said second member aperture and said removal tool comprising:

a handle;

a second shaft mounted on said handle, said second shaft being dimensioned to be inserted through said slot in said head and thereafter be received in said third channel; and an extension mounted on said second shaft to extend laterally therefrom, said extension being dimensioned to be received through said slot and upon a rotation of said second shaft be received in said fourth channel;

said tool being adaptable for use in applying a disengaging force against said fastener from its engagement with said second member.

3. The combination of claim 2 wherein said third channel has a depth which decreases dimensionally over a length of said third channel.

4. The combination of claim 1 wherein said fastener is fabricated of a resilient material.

* * * * *

UNITED STATES PATENT AND TRADEMARK OFFICE
CERTIFICATE OF CORRECTION

PATENT NO. : 5,184,377

DATED : 2/9/93

INVENTOR(S) : Ragsdale et al.

It is certified that error appears in the above-identified patent and that said Letters Patent is hereby corrected as shown below:

In Column 1, line 30, after "grommets" insert a comma;

In Column 1, line 50, after "tener" insert a period;

In Column 1, line 52, change "result" to --results--;

In Column 1, line 58, after "fastener" insert a period;

In Column 1, line 60, change "Often times" to --Oftentimes--;

In Column 2, line 27, change "am" to --an--;

In Column 2, line 34, delete the comma after "flange-like";

In Column 2, line 39, insert a period after "material" (1st occurrence);

In Column 2, line 61, insert a period after "channel";

In Column 3, line 21, insert a hyphen between "longitudinally" and "extending";

In Column 3, line 22, insert a hyphen between "laterally" and "extending";

In Column 3, line 30, insert a comma after "head" and delete --and--;

In Column 3, line 33, change "upward" to --upwardly--;

In Column 3, line 35, change "a" to --an--;

In Column 3, line 53, after "channel" delete one of the commas;

In Column 3, line 58, insert a period after "member";

In Column 4, line 15, change "holes" to --hole--;

UNITED STATES PATENT AND TRADEMARK OFFICE
CERTIFICATE OF CORRECTION

PATENT NO. : 5,184,377

DATED : 2/9/93

INVENTOR(S) : Ragsdale et al.

It is certified that error appears in the above-identified patent and that said Letters Patent is hereby corrected as shown below:

In Column 4, line 56, insert a comma after "26";

In Column 5, line 4, change "46" to --42--;

In Column 5, line 65, change "a" to --an--;

In Column 6, line 14, delete "that";

In Column 6, line 21, change "of" to --or--;

In Column 6, line 34, change "conduit" to --conduits--;

In Column 6, line 41, change "30" to --38--;

In Column 6, line 42, change "conduit" to --conduits--;

In Column 6, line 60, change "as" to --is--;

In Column 7, line 33, change "for" to --or--;

In Column 7, line 42, change the comma to a semicolon;

In Column 7, line 61, change "a" to --an--;

In Column 8, line 10, delete "that";

UNITED STATES PATENT AND TRADEMARK OFFICE
CERTIFICATE OF CORRECTION

PATENT NO. : 5,184,377

DATED : 2/9/93

INVENTOR(S) : Ragsdale et al.

It is certified that error appears in the above-identified patent and that said Letters Patent is hereby corrected as shown below:

In Column 8, line 19, change "126" to --26--;

In Column 8, line 64, change the semicolon to a comma;

In Column 8, line 68, change "firs" to --first--;

In FIG. 8, change "126" to --26--.

Signed and Sealed this

Twenty-eighth Day of June, 1994

Attest:

BRUCE LEHMAN

Attesting Officer

Commissioner of Patents and Trademarks